United States Patent [19]

Bahl et al.

[11] Patent Number: 5,278,942

[45] Date of Patent: Jan. 11, 1994

[54] SPEECH CODING APPARATUS HAVING SPEAKER DEPENDENT PROTOTYPES GENERATED FROM NONUSER REFERENCE DATA

[75] Inventors: Lalit R. Bahl, Amawalk; Jerome R. Bellegarda, Goldens Bridge; Peter V. De Souza, Mahopac Falls; Ponani S. Gopalakrishnan, Croton-on-Hudson; Arthur J. Nadas, Rock Tavern; David Nahamoo; Michael A. Picheny, both of White Plains, all of N.Y.

[73] Assignee: International Business Machines Corporation, Armonk, N.Y.

[21] Appl. No.: 802,678

[22] Filed: Dec. 5, 1991

[51] Int. Cl.$^5$ .............................................. G10L 9/02
[52] U.S. Cl. ...................................................... 395/2
[58] Field of Search .................................. 381/29–45; 395/2

[56] References Cited

U.S. PATENT DOCUMENTS

| | | | |
|---|---|---|---|
| 4,651,289 | 3/1987 | Maeda et al. | 381/43 |
| 4,751,737 | 6/1988 | Gerson et al. | 381/43 |
| 4,817,156 | 3/1989 | Bahl et al. | 381/43 |
| 4,829,577 | 5/1989 | Kuroda et al. | 381/43 |
| 4,980,918 | 12/1990 | Bahl et al. | 381/43 |

OTHER PUBLICATIONS

Tappert et al., "Fast Training Method for Speech Recognition Systems," IBM Technical Disclosure Bulletin, vol. 21, No. 8, Jan. 1979, pp. 3413-3414.

Bahl, L. R. et al. "Acoustic Markov Models Used In The Tangora Speech Recognition System." Proceedings of the 1988 IEEE International Conference on Acoustics, Speech, and Signal Processing, S11-3, pp. 497-500, Apr. 1988.

Bahl, L. R., et al. "Fast Algorithm for Deriving Acoustic Prototoypes for Automatic Speech Recognition." U.S. patent application Ser. No. 732,714, filed on Jul. 16, 1991.

Bahl, L. R., et al. "A Maximum Likelihood Approach to Continuous Speech Recognition." IEEE Transactions on Pattern Analysis and Machine Intelligence, vol. PAMI-5, No. 2, pp. 179-190, Mar. 1983.

Bahl, L. R., et al. "Metamorphic Transformations For Speech Recognition." IBM Technical Disclosure Bulletin, vol. 33, No. 1A, Jun. 1990, pp. 291-292.

Bahl, L. R., et al. "Speaker Independent Label Coding Apparatus." U.S. patent application Ser. No. 673,810, filed Mar. 22, 1991.

Bahl, L. R., et al. "Vector Quantization Procedure For Speech Recognition Systems Using Discrete Parameter Phoneme-Based Markov Word Models." IBM Technical Disclosure Bulletin, vol. 34, No. 7, Dec. 1989, pp. 340 and 341.

Hartigan, J. A. "The K-Means Algorithm." Clustering Algorithms, pp. 84-105, John Wiley & Sons, 1975.

Jelinek, F. "Continuous Speech Recognition By Statistical Methods." Proceedings of the IEEE, vol. 64, No. 4, pp. 532-556, Apr. 1976.

Jelinek, F. "The Development of an Experimental Discrete Dictation Recognizer." Proceedings of the IEEE, vol. 73, No. 11, Nov. 1985, pp. 1116-1624.

Primary Examiner—Michael R. Fleming
Assistant Examiner—Michelle Doerrler
Attorney, Agent, or Firm—Marc D. Schechter

[57] ABSTRACT

A speech coding apparatus and method for use in a speech recognition apparatus and method. The value of at least one feature of an utterance is measured during each of a series of successive time intervals to produce a series of feature vector signals representing the feature values. A plurality of prototype vector signals, each having at least one parameter value and a unique identification value are stored. The closeness of the feature vector signal is compared to the parameter values of the prototype vector signals to obtain prototype match scores for the feature value signal and each prototype vector signal. The identification value of the prototype vector signal having the best prototype match score is output as a coded representation signal of the feature vector signal. Speaker-dependent prototype vector signals are generated from both synthesized training vector signals and measured training vector signals. The synthesized training vector signals are transformed reference feature vector signals representing the values of features of one or more utterances of one or more speakers in a reference set of speakers. The measured training feature vector signals represent the values of features of one or more utterances of a new speaker/user not in the reference set.

39 Claims, 3 Drawing Sheets

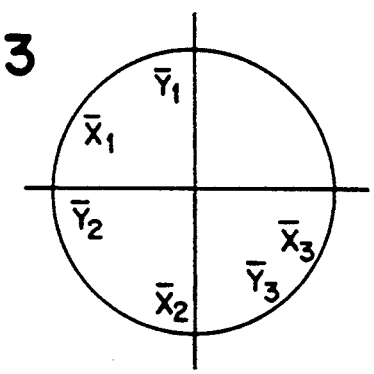

SPEECH CODING APPARATUS HAVING SPEAKER DEPENDENT PROTOTYPES GENERATED FROM NONUSER REFERENCE DATA

BACKGROUND OF THE INVENTION

The invention relates to speech coding, such as for computerized speech recognition. Speech coding involves the generation of an electrical signal representing at least some information about an utterance.

Speech coding devices and speech recognition systems may be either speaker-independent, or speaker-dependent. Speaker-independent speech recognition systems have parameters whose values are fixed for all speakers who use the system. Speaker-dependent speech recognition systems have at least some parameters whose values for one speaker differ from the parameter values for other speakers.

By choosing suitable parameter values for each individual speaker, the speaker-dependent speech recognition system generally achieves a higher word recognition rate (or a lower word error rate) than a speaker-independent speech recognition system. However, a relatively large amount of training data is required from each new speaker in order to obtain speaker-dependent parameter values which will yield a suitably high word recognition rate.

SUMMARY OF THE INVENTION

It is an object of the invention to reduce the amount of training data required from a new speaker to obtain speaker-dependent parameter values for speech coding for a speech recognition system, while obtaining a suitably high word recognition rate.

According to the invention, a speech coding apparatus comprises means for measuring the value of at least one feature of an utterance during each of a series of successive time intervals to produce a series of feature vector signals representing feature values. A plurality of prototype vector signals are stored. Each prototype vector signal has at least one parameter value, and has a unique identification value. The closeness of the feature value of a feature vector signal is compared to the parameter values of the prototype vector signals to obtain prototype match scores for the feature vector signal and each prototype vector signals. At least the identification value of the prototype vector signal having the best prototype match score is output as a coded representation signal of the feature vector signal.

The speech coding apparatus according to the invention further comprises means for storing a plurality of reference feature vector signals and means for storing a plurality of measured training feature vector signals. Each reference feature vector signal represents the value of at least one feature of one or more utterances of one or more speakers in a reference set of speakers during each of a plurality of successive time intervals. Each measured training feature vector signal represents the value of at least one feature of one or more utterances of a speaker not in the reference set during each of a plurality of successive time intervals. At least one reference feature vector signal is transformed into a synthesized training feature vector signal. Thereafter, the prototype vector signals are generated from both the measured training vector signals and from the synthesized training feature vector signal.

In one aspect of the invention, the transforming means applies a nonlinear transformation to the reference feature vector signal to produce the synthesized training feature vector signal. The nonlinear transformation may be, for example, a piecewise linear transformation. The piecewise linear transformation may, for example, map the reference feature vector signals to the training feature vector signals.

In another aspect of the invention, a first subset of the reference feature vector signals has a mean, and a first subset of the training feature vector signals has a mean. The nonlinear transformation maps the mean of the first subset of the reference feature vector signals to the mean of the first subset of the training feature vector signals.

The first subset of the reference feature vector signals and the first subset of the training feature vector signals also have variances, respectively. The nonlinear transformation may, for example, map the variance of the first subset of the reference feature vector signals to the variance of the first subset of the training feature vector signals.

The prototype vector signals may be stored in, for example, electronic read/write memory. The means for measuring the value of at least one feature of an utterance may comprise a microphone.

A speech recognition apparatus according to the invention comprises means for measuring the value of at least one feature of an utterance during each of series of successive time intervals to produce a series of feature vector signals representing the feature values. A plurality of prototype vector signals having parameter values and identification values are stored. The closeness of the feature value of each feature vector signal to the parameter values of prototype vector signals are compared to obtain prototype match scores for each feature vector signal and each prototype vector signal. At least the identification values of the prototype vector signals having the best prototype match score for each feature vector signal are output as a sequence of coded representations of the utterance.

A match score is generated for each of a plurality of speech units. Each match score comprises an estimate of the closeness of a match between a model of the speech unit and the sequence of coded representations of the utterance. One or more best candidate speech units having the best match scores are identified, and at least one speech subunit of one or more of the best candidate speech units is output.

The speech recognition apparatus further comprises means for storing a plurality of reference feature vector signals and means for storing a plurality of measured training feature vector signals. Each reference feature vector signal represents the value of at least one feature of one or more utterances of one or more speakers in a reference set of speakers. Each measured training feature vector signal represents the value of at least one feature of one or more utterances of a speaker not in the reference set. At least one reference feature vector signal is transformed into a synthesized training feature vector signal. Thereafter, the prototype vector signals are generated from both the measured training vector signals and from the synthesized training vector signal.

In one aspect of the invention, the transformation is a nonlinear transformation, such as a piecewise linear transformation. The nonlinear transformation may, for example, map the mean and/or the variance of a subset of the reference feature vector signals to the mean and- /or the variance of a subset of the training feature vector signals.

The speech subunit output means may be, for example, a video display such as a cathode ray tube, a liquid crystal display, or a printer. Alternatively, the speech subunit output may be an audio generator such as a speech synthesizer containing a loudspeaker or a headphone.

By generating the parameters of the prototype vector signals from both the measured training vector signal (corresponding to utterances by the new speaker/user who is training the speech recognition system) and from the synthesized training vector signal (corresponding to utterances by speakers other than the new speaker/user) the training data required from the new speaker/user can be reduced, while achieving a suitably high word recognition rate.

BRIEF DESCRIPTION OF THE DRAWING

FIG. 2 schematically shows an example of the normalization of feature vectors for generating a partial transformation.

FIG. 3 schematically shows an example of the pairing of subsets of feature vectors for generating a further partial transformation.

FIG. 4 schematically shows an example of a transformation of reference feature vectors to form synthesized training feature vectors.

DESCRIPTION OF THE PREFERRED EMBODIMENTS

Figure 1:
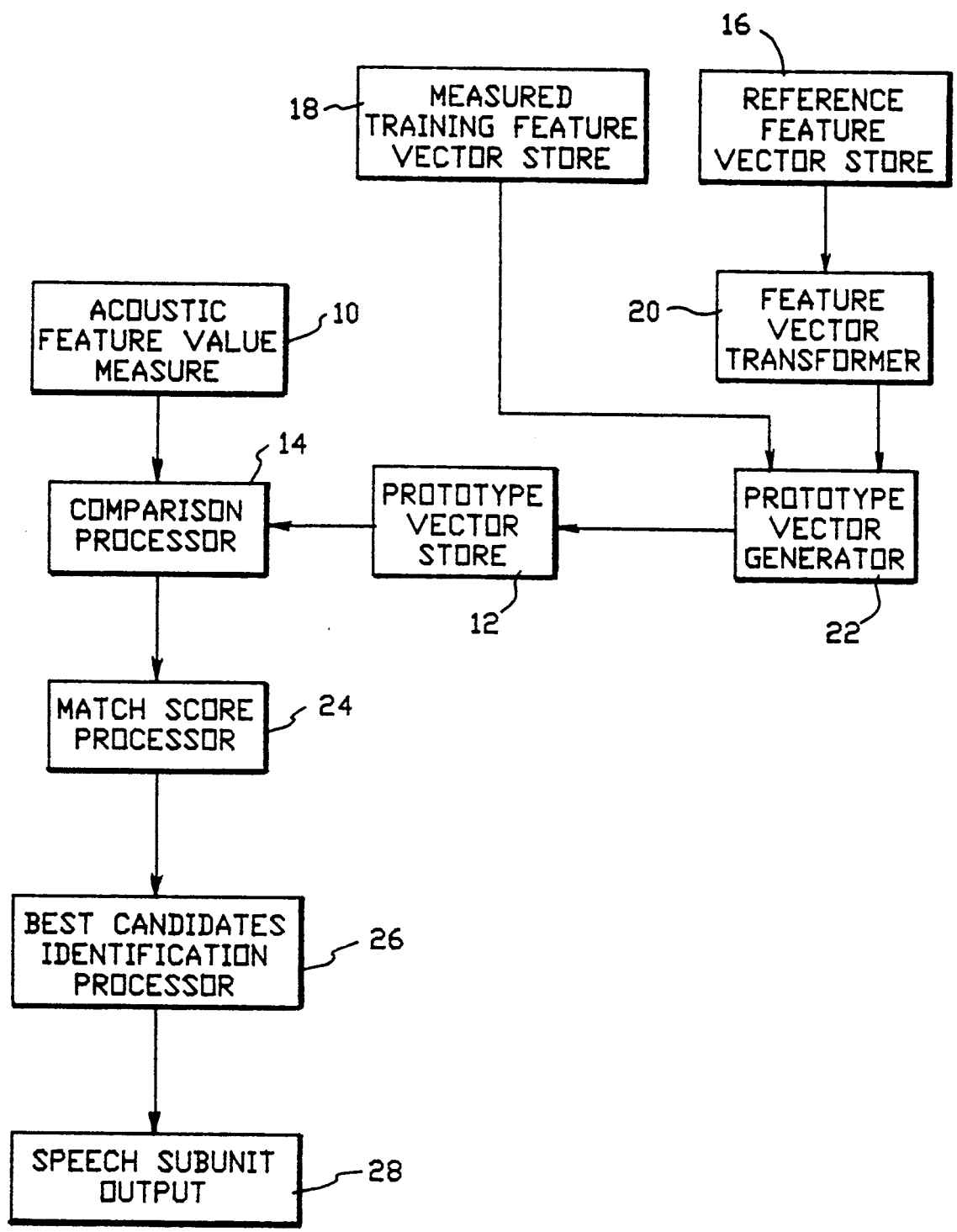
FIG. 1 is a block diagram of an example of a speech recognition apparatus according to the present invention containing a speech coding apparatus according to the present invention.

Referring to FIG. 1, a speech coding apparatus comprises means 10 for measuring the value of at least one feature of an utterance during each of a series of successive time intervals to produce a series of feature vector signals representing the feature values. The feature may be, for example, either the amplitude or the energy of the utterance in one or more frequency bands. A prototype vector store 12 stores a plurality of prototype vector signals. Each prototype vector signal has at least one parameter value and has a unique identification value.

A comparison processor 14 compares the closeness of the feature value of a feature vector signal to the parameter values of the prototype vector signals to obtain prototype match scores for the feature vector signal and each prototype vector signal. The comparison processor 14 outputs at least the identification value of the prototype vector signal having the best prototype match score as a coded representation signal of the feature vector signal.

A reference feature vector store 16 stores a plurality of reference feature vector signals. Each reference feature vector signal represents the value of at least one feature of one or more utterances of one or more speakers in a reference set of speakers during each of a plurality of successive time intervals. The speakers in the reference set of speakers are not the current user of the speech coding apparatus. The reference feature vector signals may have been produced, for example, by the acoustic feature value measure 10.

A measured training feature vector store 18 stores a plurality of measured training feature vector signals. Each measured training feature vector signal represents the value of at least one feature of one or more utterances of a speaker not in the reference set during each of a plurality of successive time intervals. The speaker not in the reference set is the current user of the speech coding apparatus. The measured training feature vector signals may be produced, for example, by the acoustic feature value measure 10.

A feature vector transformer 20 is provided for transforming at least one reference feature vector signal into a synthesized training feature vector signal. Thereafter, a prototype vector generator 22 generates prototype vector signals (for prototype vector store 12) from both the measured training feature vector signals and from the synthesized training feature vector signal.

By generating the parameters of the prototype vector signals from both the measured training vector signal (corresponding to utterances by the new speaker/user who is training the speech recognition system) and from the synthesized training vector signal (corresponding to utterances by speakers other than the new speaker/user) the training data required from the new speaker/user can be reduced, while achieving a suitably high word recognition rate.

According to one aspect of the invention, the feature vector transformer 20 applies a nonlinear transformation to at least one reference feature vector signal to produce the synthesized training feature vector signal. The nonlinear transformation may be, for example, a piecewise linear transformation.

Table 1 shows a hypothetical example of a nonlinear transformation of reference feature vectors to produce synthesized feature vectors.

TABLE 1

| Reference Feature Vector (RFV) | Elementary Acoustic Model | Transformation | Synthesized Feature Vector |
|---|---|---|---|
| 0.67 | E1 | 1.5(RFV − 1.2) | −1.10 |
| 0.82 | E3 | 0.1(RFV + 1) | 0.18 |
| 0.42 | E5 | 1.8(RFV + 1.6) | 3.64 |
| 0.82 | E1 | 1.5(RFV − 1.2) | −0.87 |
| 0.85 | E4 | 1.3(RFV + 1.8) | 3.45 |
| 0.07 | E3 | 0.1(RFV + 1) | 0.11 |
| 0.45 | E2 | 0.7(RFV + 0.2) | 0.46 |
| 0.07 | E6 | 0.9(RFV − 2) | −1.74 |
| 0.08 | E6 | 0.9(RFV − 2) | −1.73 |
| 0.01 | E2 | 0.7(RFV + 0.2) | 0.15 |
| 0.35 | E9 | 1.1(RFV − 1.2) | −0.94 |
| 0.8 | E2 | 0.7(RFV + 0.2) | 0.70 |
| 1 | E8 | 0.4(RFV + 1.8) | 1.12 |
| 0.51 | E3 | 0.1(RFV + 1) | 0.15 |
| 0.22 | E6 | 0.9(RFV − 2) | −1.60 |

In this hypothetical example, the reference feature vectors are one-dimensional and the synthesized feature vectors are one-dimensional. The sequence of reference feature vectors corresponds to a sequence of one or more words uttered by one or more speakers in the reference set of speakers. An acoustic word model is associated with each of the uttered words. Each acoustic word model comprises one or more elementary acoustic models from a finite set of elementary acoustic models (in this example, a set of ten elementary acoustic models).

Each elementary acoustic model may be, for example, a Markov model having at least two states, at least one transition from one state to the other state, a probability of occurrence of the transition, and output probabilities of producing one of the prototype vector signals at the occurrence of a transition. By finding the path through the acoustic model of the reference utterance which is most likely to produce the sequence of reference feature vector signals, each reference feature vector signal can be "aligned" with the elementary model which most likely produced the reference feature vector signal. Such a path can be found, for example, by the Viterbi algorithm. (See, for example, F. Jelinek, "Continuous Speech Recognition By Statistical Methods." *Proceedings of the IEEE*, Volume 64, No. 4, pages 532-556, April 1976.) The second column of Table 1 identifies the hypothetical elementary acoustic model which most likely corresponds to each hypothetical reference feature vector.

The nonlinear transformation shown in the example of Table 1 is piecewise linear. That is, for each elementary acoustic model there is a linear transformation of the associated reference feature vectors to produce corresponding synthesized training feature vectors. However, the parameters of the linear transformations differ in dependence on the associated elementary acoustic model. Consequently, the transformation of the reference feature vectors as a whole is nonlinear.

The comparison processor 14, the feature vector transformer 20, and the prototype vector generator 22 of the speech coding apparatus according to the present invention may be suitably programmed special purpose or general purpose digital signal processors. The prototype vector store 12, the reference feature vector store 16, and the measured training feature vector store 18 may be electronic computer memory such as read/write memory.

The form and the parameters of the nonlinear transformation of reference feature vectors into synthesized training feature vectors can be obtained, for example, in the following manner. In this example, the pronunciation of each word represented by an acoustic hidden Markov model. (See, for example, L. R. Bahl, et al, "A Maximum Likelihood Approach to Continuous Speech Recognition," *IEEE Transactions on Pattern Analysis and Machine Intelligence*, Volume PAMI-5, No. 2, pages 179-190, Mar. 1983.) Each Markov word model in this example is composed of one or more subword acoustic models from a finite set of subword acoustic models. Each subword acoustic model may represent, for example, an allophone, a phoneme, a syllable or some other speech unit. (See, for example, F. Jelinek, "The Development of An Experimental Discrete Dictation Recognizer," *Proceedings IEEE*, Volume 73, No. 11, pages 1616-1624, Nov. 1985; L. R. Bahl et al, "Acoustic Markov Models Used In The Tangora Speech Recognition System," *Proceedings* 1988 *International Conference on Acoustics, Speech, and Signal Processing*, New York, N.Y., pages 497-500, April, 1988.) Further, in this example each subword model comprises a sequence of one or more elementary acoustic models from a finite alphabet of elementary acoustic models. Typically, the size of the subword acoustic model alphabet is approximately 2,000, while the size of the elementary acoustic model alphabet is approximately 300.

As a first step in obtaining the nonlinear transformation, reference feature vectors are obtained from utterances of known words by one or more speakers in the reference set of speakers. Measured training feature vectors are obtained from utterances of known words by the speaker who is not in the reference set of speakers. The feature vectors are obtained from the utterances by an acoustic feature value measure such as block 10 shown in FIG. 1.

Using an initial set of prototype vectors, the reference feature vectors and the measured training feature vectors are labelled with the identification values of the closest initial prototype vectors. Since the words corresponding to the training utterances are known, and since each word has a known corresponding acoustic Markov model, each feature vector is associated with an acoustic word model, an acoustic subword model within the word model, and an elementary acoustic word model within the subword model to which the feature vector most likely corresponds. This "alignment" can be obtained, for example, by finding the path through each utterance model which is most likely to produce the reference feature vectors or the measured training feature vectors, respectively. Such paths can be found, for example, by the Viterbi algorithm described above.

For each elementary acoustic Markov model, the corresponding reference feature vectors and the corresponding measured training feature vectors are identified. For each elementary acoustic Markov model, the mean vector $M_r$ and the covariance matrix $S_r$ are obtained for all of the reference features vectors corresponding to that elementary acoustic Markov model. Similarly, the mean vector $M_t$ and the covariance matrix $S_t$ are obtained for all measured training feature vectors corresponding to that elementary acoustic Markov model.

From the mean vectors and covariance matrices, each reference feature vector X corresponding to the elementary acoustic Markov model is transformed by the equation $$\overline{X} = S_r^{-\frac{1}{2}}(X - M_r) \qquad [1]$$

so that the vectors $\overline{X}$ have a mean vector of zero and a covariance matrix I (the identity matrix).

Similarly, each measured training feature vector Y corresponding to the elementary acoustic Markov model is transformed by the equation $$\overline{Y} = S_t^{-\frac{1}{2}}(Y - M_t) \qquad [2]$$

so that the vectors $\overline{Y}$ also have a mean vector of zero and a covariance matrix I.

FIG. 2 schematically shows the normalization of the reference feature vectors X, and the measured training feature vectors Y. For the purpose of Equations 1 and 2, the inverse square root of the covariance matrix can be given by $$S^{-\frac{1}{2}} = Q\Lambda^{-\frac{1}{2}}Q^T \qquad [3]$$

where Q is the eigenvector matrix of the covariance matrix S, where $\Lambda$ is the diagonal matrix of corresponding eigenvalues, and where $Q^T$ is the transpose of matrix Q.

Moreover, to insure that the covariance matrix is full rank, if either the number of reference feature vectors or the number of measured training feature vectors is less than one plus the number of dimensions in each feature vector, then both covariance matrices are reduced to diagonal matrices. Further, if either the number of reference feature vectors or the number of measured training feature vectors is less than a selected minimum number, such as 5, then both covariance matrices are set equal to the identity matrix. (As will be further discussed below, in one example of the invention each feature vector has 50 dimensions.)

Each normalized reference feature vector $\overline{X}$ is now tagged with (a) the identity of the associated subword acoustic Markov model to which it most likely corresponds, (b) the location within the subword acoustic Markov model of the corresponding elementary acoustic model, and (c) the location of the feature vector within the sequence of feature vectors corresponding to the subword acoustic Markov model. Each normalized measured training feature vector $\overline{Y}$ is tagged with the same information.

In practice, the location of the feature vector within the sequence of feature vectors corresponding to the subword acoustic Markov model may be thresholded away from the boundaries of the subword model. For example, a reasonable threshold is four feature vectors.

For each tag k which corresponds to both reference feature vectors and measured training feature vectors, the number $r_k$ of normalized reference feature vectors corresponding to that tag, and the centroid $\overline{X}_k$ of the normalized reference feature vectors corresponding to that tag are obtained. Similarly, the number $t_k$ of measured training feature vectors corresponding to that tag, and the centroid $\overline{Y}_k$ of the normalized measured training feature vectors corresponding to that tag are obtained. Thus, for each tag k, a pair of matched vectors $(\overline{X}_k, \overline{Y}_k)$ is obtained, as schematically shown in FIG. 3.

From the pairs of matched vectors $(\overline{X}_k, \overline{Y}_k)$, for each elementary acoustic model, the weighted least squares estimate $\Gamma$ of the transformation $\overline{Y} = \Gamma \overline{X}$ is obtained by $$\Gamma = G(G^T G)^{-\frac{1}{2}} \quad [4]$$

where $$G = \sum_k \frac{r_k t_k}{r_k + t_k} \overline{Y}_k \overline{X}_k^T \quad [5]$$

It should be noted that when the number of measured training feature vectors from the new speaker corresponding to a single elementary acoustic Markov model is small, the estimation of the transformation $\Gamma$ may not be accurate. In this case, the feature vectors corresponding to two (or more, if necessary) different elementary acoustic Markov models may be combined to generate a single transformation for both elementary acoustic Markov models.

From the previously obtained mean vectors, covariance matrices, and transformation $\Gamma$, synthesized training feature vectors $\hat{X}$ associated with an elementary acoustic Markov model may be obtained from reference feature vectors X corresponding to that model according to the transformation $$\hat{X} = AX + B = (S_t^{\frac{1}{2}} \Gamma S_r^{-\frac{1}{2}}) X + (M_t - S_t^{\frac{1}{2}} \Gamma S_r^{-\frac{1}{2}} M_r) \quad [6]$$

Equation 6 represents a linear transformation of reference feature vectors corresponding to a given elementary acoustic Markov model into synthesized training feature vectors corresponding to that elementary model, and is schematically illustrated in FIG. 4. The resulting synthesized training feature vectors will have the same mean vector as the measured training feature vectors corresponding to that elementary model, and will have the same covariance matrix as the measured training feature vectors corresponding to that elementary model.

Moreover, the resulting synthesized training feature vectors corresponding to a subgroup $X_k$ of reference feature vectors having the tag k, will have nearly the same mean vector as the measured training feature vectors corresponding to the subgroup $Y_k$ having the same tag k.

Since the transformation of reference feature vectors into synthesized training feature vectors will differ, depending on the elementary acoustic Markov model to which the reference feature vectors correspond, the overall transformation is piecewise linear. Therefore, the overall transformation is nonlinear.

Having obtained the piecewise linear transformation of reference feature vectors into synthesized training feature vectors, the prototype vector signals may, for example, be generated from the measured training feature vectors and from the synthesized training feature vectors in the following manner.

Each synthesized training feature vector $\hat{X}$ is tagged with (a) the identification of its corresponding elementary acoustic Markov model, (b) the identification of its corresponding subword acoustic Markov model, (c) the location of the corresponding elementary acoustic Markov model within the subword acoustic Markov model, and (d) the location of the corresponding reference feature vector within the sequence of reference feature vectors corresponding to the subword model. Starting with an initial clustering of the synthesized training feature vectors $\hat{X}$ according to these tags, K-means Euclidean clustering is performed to obtain preliminary subprototypes for each elementary acoustic Markov model. (See, for example, J. A. Hartigan, "The K-means Algorithm," *Clustering Algorithms*, pages 84–105. John Wiley & Sons. 1975.) At this stage, each preliminary subprototype corresponds to the mean vector of a cluster of synthesized training feature vectors corresponding to the elementary acoustic Markov model. Each set of preliminary subprototypes corresponding to an elementary acoustic Markov model forms a preliminary prototype vector signal.

Starting with the preliminary subprototypes obtained by K-means Euclidean clustering of the synthesized training feature vectors, K-means Gaussian clustering is performed on merged data consisting of the combination of the synthesized training feature vectors $\hat{X}$, and the measured training vectors Y corresponding to each elementary acoustic Markov model so as to obtain final Gaussian subprototypes for each elementary acoustic Markov model.

Each Gaussian subprototype corresponds to the mean vector and covariance matrix of a cluster of synthesized training feature vectors and measured training feature vectors corresponding to an elementary acoustic Markov model. Each covariance matrix is preferably simplified by setting the off-diagonal terms to zero. Each subprototype is weighted by its conditional probability, given the occurrence of the elementary acoustic Markov model. This conditional probability is estimated as the number of synthesized and measured training feature vectors corresponding to the subprototype, divided by the number of synthesized and measured training feature vectors corresponding to the elementary acoustic model.

From the measured training vectors corresponding to the new speaker training data, the prior probability of each elementary acoustic Markov model is estimated as the number of measured training feature vectors corresponding to each elementary acoustic Markov model, divided by the total number of measured training feature vectors. For each subprototype, the conditional probability estimated above is multiplied by the probability of the corresponding elementary acoustic Markov model so as to obtain the probability of the subprototype.

Each set of Gaussian subprototypes corresponding to an elementary acoustic Markov model forms a prototype vector signal.

In one example of an alternative method of clustering the merged synthesized training feature vectors and measured training feature vectors, the training feature vector signals may be clustered by specifying that each cluster corresponds to a single elementary model in a single location in a single word-segment model. Such a method is described in more detail in U.S. patent application Ser. No. 732,714, filed on Jul. 16, 1991, entitled "Fast Algorithm for Deriving Acoustic Prototypes for Automatic Speech Recognition."

In another example of an alternative method of clustering the merged synthesized training feature vectors and measured training feature vectors, all of the training feature vectors generated by the utterance of a training text and which correspond to a given elementary model may be clustered by K-means Euclidean clustering followed by K-means Gaussian clustering, without regard to the subword or elementary models to which the training feature vectors correspond. Such a method is described, for example, in U.S. patent application Ser. No. 673,810, filed on Mar. 22, 1991 entitled "Speaker-Independent Label Coding Apparatus", now U.S. Pat. No. 5,182,773.

Returning to FIG. 1, a speech recognition apparatus according to the present invention includes an acoustic feature value measure 10, for measuring the value of at least one feature of an utterance during each of a series of successive time intervals to produce a series of feature vector signals representing the feature values. Prototype vector store 12 stores a plurality of prototype vector signals. Each prototype vector signal has at least one parameter value and has a unique identification value. Comparison processor 14 compares the closeness of the feature value of each feature vector signal to the parameter values of the prototype vector signals to obtain prototype match scores for each feature vector signal and each prototype vector signal. Comparison processor 14 outputs at least the identification values of the prototype vector signals having the best prototype match score for each feature vector signal as a sequence of coded representations of the utterance.

The speech recognition apparatus further includes a match score processor 24 for generating a match score for each of a plurality of speech units comprising one or more speech subunits. Each speech unit may be, for example, a sequence of one or more words. Each speech subunit may be, for example, a single word. Each match score comprises an estimate of the closeness of a match between a model of the speech unit and the sequence of coded representations of the utterance.

A best candidates identification processor 26 identifies one or more best candidate speech units having the best match scores. A speech subunit output 28 outputs at least one speech subunit of one or more of the best candidate speech units.

As described in connection with the speech coding apparatus according to the invention, the speech recognition apparatus further includes reference feature vector store 16, measured training feature vector store 18, feature vector transformer 20, and prototype vector generator 22.

The speech units may, for example, be modelled as probabilistic Markov models. In this case, each match score may be, for example, either (a) the total probability for all paths through the Markov model of producing the sequence of coded representations of the utterance, or (b) the probability of producing the sequence of coded representations of the utterance for the most probable path through the Markov model. (See, for example, L. R. Bahl et al, "A Maximum Likelihood Approach to Continuous Speech Recognition," *IEEE Transactions on Pattern Analysis and Machine Intelligence*, Volume PAMI-5, Volume 2, pages 179-190, March 1983.)

If all of the candidate speech units comprise sequences of two or more words, and if the word sequences of all of the best candidate speech units begin with the same word, then the speech subunit output 28 may, for example, output that one word which forms the beginning of all of the best candidate speech units.

The match score processor 24 may, in addition to estimating the probability that the probabilistic model of a speech unit would output a series of model outputs matching the sequence of coded representations of the utterance, also estimate the probability of occurrence of the speech unit itself. The estimate of the probability of occurrence of the speech unit may be obtained by a language model. (See, for example, F. Jelinek, "Continuous Speech Recognition By Statistical Methods," *Proceedings of the IEEE*, Volume 64, No. 4, pages 532-556, April 1976.)

In the speech recognition apparatus, the match score processor 24 and the best candidate identification processor 26 may be made by suitably programming either a special purpose or a general purpose digital computer. The speech subunit output 28 may be, for example, a video display, such as a cathode ray tube, a liquid crystal display, or a printer. Alternatively, the output may be an audio output device such as a speech synthesizer having a loudspeaker or headphones.

Figure 5:
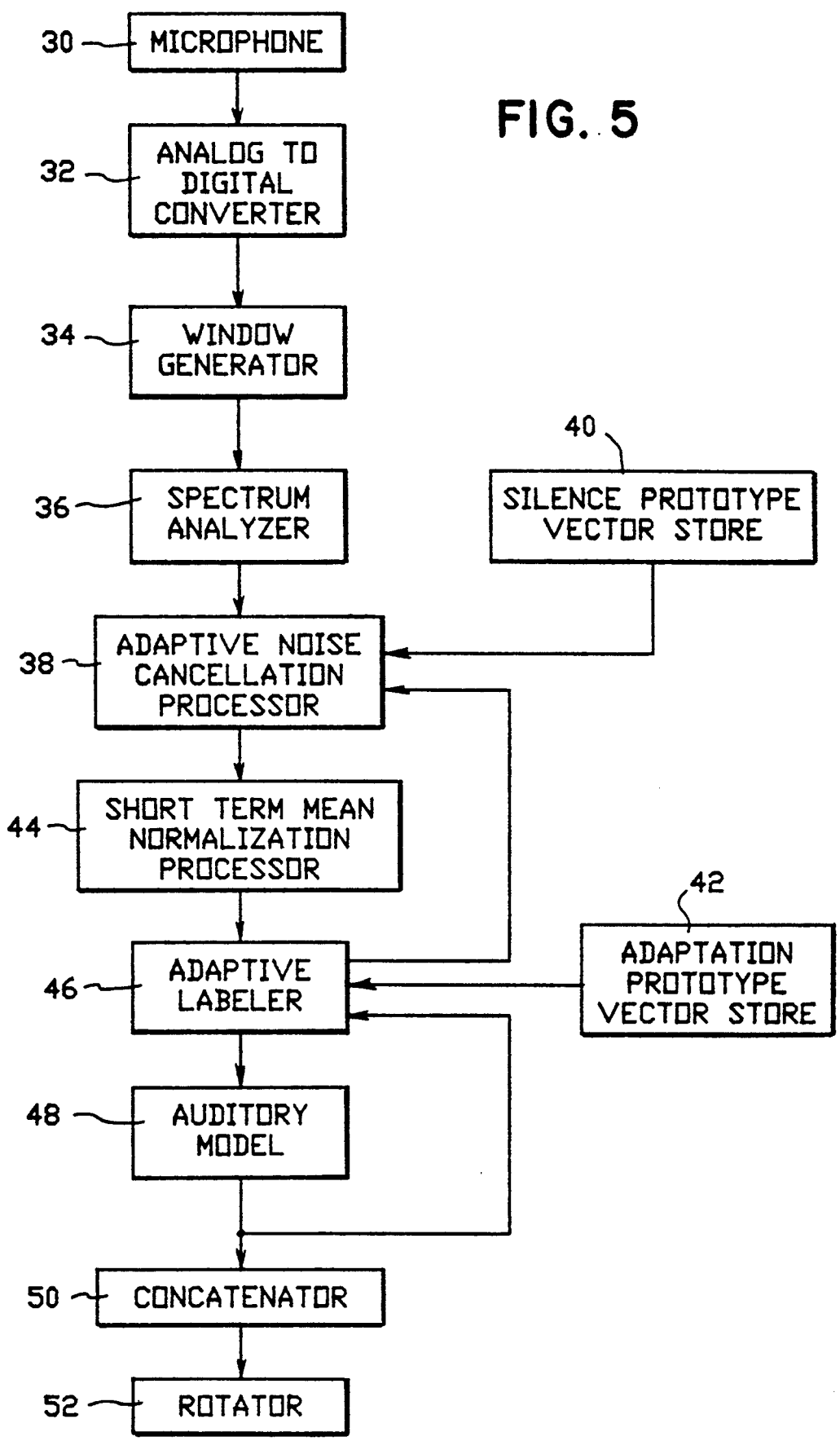
FIG. 5 is a block diagram of an example of an acoustic feature value measure.

One example of an acoustic feature value measure is shown in FIG. 5. The measuring means includes a microphone 30 for generating an analog electrical signal corresponding to the utterance. The analog electrical signal from microphone 30 is converted to a digital electrical signal by analog to digital converter 32. For this purpose, the analog signal may be sampled, for example, at a rate of twenty kilohertz by the analog to digital converter 32.

A window generator 34 obtains, for example, a twenty millisecond duration sample of the digital signal from analog to digital converter 32 every ten milliseconds (one centisecond). Each twenty millisecond sample of the digital signal is analyzed by spectrum analyzer 36 in order to obtain the amplitude of the digital signal sample in each of, for example, twenty frequency bands. Preferably, spectrum analyzer 36 also generates a twenty-first dimension signal representing the total amplitude or total power of the twenty millisecond digital signal sample. The spectrum analyzer 36 may be, for example, a fast Fourier transform processor. Alternatively, it may be a bank of twenty band pass filters.

The twenty-one dimension vector signals produced by spectrum analyzer 36 may be adapted to remove background noise by an adaptive noise cancellation processor 38. Noise cancellation processor 38 subtracts a noise vector N(t) from the feature vector F(t) input into the noise cancellation processor to produce an output feature vector F'(t). The noise cancellation processor 38 adapts to changing noise levels by periodically updating the noise vector N(t) whenever the prior feature vector F(t−1) is identified as noise or silence. The noise vector N(t) is updated according to the formula $$N(t) = \frac{N(t-1) + k[F(t-1) - Fp(t-1)]}{(1+k)},  \quad [7]$$

where N(t) is the noise vector at time t, N(t−1) is the noise vector at time (t−1), k is a fixed parameter of the adaptive noise cancellation model, F(t−1) is the feature vector input into the noise cancellation processor 38 at time (t−1) and which represents noise or silence, and Fp(t−1) is one silence or noise prototype vector, from store 40, closest to feature vector F(t−1).

The prior feature vector F(t−1) is recognized as noise or silence if either (a) the total energy of the vector is below a threshold, or (b) the closest prototype vector in adaptation prototype vector store 42 to the feature vector is a prototype representing noise or silence. for the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of the input speech by short term mean normalization processor 44. Normalization processor 44 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad [8]$$

in the logarithmic domain, where $F'_i(t)$ is the i-th component of the unnormalized vector at time t, and where Z(t) is a weighted mean of the components of F'(t) and Z(t−1) according to Equations 9 and 10:

$$Z(t) = 0.9Z(t-1) + 0.1M(t) \quad [9]$$

and where $$M(t) = \frac{1}{20} \sum_i F'_i(t) \quad [10]$$

The normalized twenty dimension feature vector X(t) may be further processed by an adaptive labeler 46 to adapt to variations in pronunciation of speech sounds. An adapted twenty dimension feature vector X'(t) is generated by subtracting a twenty dimension adaptation vector A(t) from the twenty dimension feature vector X(t) provided to the input of the adaptive labeler 46. The adaptation vector A(t) at time t may, for example, be given by the formula $$A(t) = \frac{A(t-1) + k[X(t-1) - Xp(t-1)]}{(1+k)}, \quad [11]$$

where k is a fixed parameter of the adaptive labeling model, X(t−1) is the normalized twenty dimension vector input to the adaptive labeler 46 at time (t−1), Xp(t−1) is the adaptation prototype vector (from adaptation prototype store 42) closest to the twenty dimension feature vector X(t−1) at time (t−1), and A(t−1) is the adaptation vector at time (t−1).

The twenty dimension adapted feature vector signal X'(t) from the adaptive labeler 46 is preferably provided to an auditory model 48. Auditory model 48 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 48 calculates a new parameter $E_i(t)$ according to Equations 12 and 13:

$$E_i(t) = K_1 + K_2(X'_i(t))(N_i(t-1)) \quad [12]$$

where $$N_i(t) = K_3 \times N_i(t-1) - E_i(t-1) \quad [13]$$

and where $K_1$, $K_2$, and $K_3$ are fixed parameters of the auditory model.

For each centisecond time interval, the output of the auditory model 48 is a modified twenty dimension feature vector signal. This feature vector is augmented by a twenty-first dimension having a value equal to the square root of the sum of the squares of the values of the other twenty dimensions.

For each centisecond time interval, a concatenator 50 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 52 by a rotation matrix to rotate the spliced vector and to reduce the spliced vector to fifty dimensions.

The rotation matrix used in rotator 52 may be obtained, for example, by classifying into M classes a set of 189 dimension spliced vectors obtained during a training session. The covariance matrix for all of the spliced vectors in the training set is multiplied by the inverse of the sample within-class covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 34, No.7 December 1989, pages 340 and 341.)

Window generator 34, spectrum analyzer 36, adaptive noise cancellation processor 38, short term mean normalization processor 44, adaptive labeler 46, auditory model 48, concatenator 50, and rotator 52, may be suitably programmed special purpose or general purpose digital signal processors. Prototype stores 40 and 42 may be electronic computer memory.

We claim:

1. A speech coding apparatus comprising:

means for measuring the value of at least one feature of an utterance during each of a series of successive time intervals to produce a series of feature vector signals representing the feature values;

means for storing a plurality of prototype vector signals, each prototype vector signal having at least one parameter value, each prototype vector signal having a unique identification value;

means for comparing the closeness of the feature value of a feature vector signal to the parameter values of the prototype vector signals to obtain prototype match scores for the feature vector signal and each prototype vector signal; and means for outputting at least the identification value of the prototype vector signal having the best prototype match score as a coded representation signal of the feature vector signal;

characterized in that the apparatus further comprises:

means for storing a plurality of reference feature vector signals, each reference feature vector signal representing the value of at least one feature of one or more utterances of one or more speakers in a reference set of speakers during each of a plurality of successive time intervals;

means for storing a plurality of measured training feature vector signals, each measured training feature vector signal representing the value of at least one feature of one or more utterances of a speaker not in the reference set during each of a plurality of successive time intervals;

means for transforming at least one reference feature vector signal into a synthesized training feature vector signal; and means for generating the prototype vector signals from both the measured training vector signals and from the synthesized training vector signal.

2. A speech coding apparatus as claimed in claim 1, characterized in that the transforming means applies a nonlinear transformation to the reference feature vector signal to produce the synthesized training feature vector signal.

3. A speech coding apparatus as claimed in claim 2, characterized in that the nonlinear transformation is a piecewise linear transformation.

4. A speech coding apparatus as claimed in claim 3, characterized in that the nonlinear transformation maps the reference feature vector signals to the training feature vector signals.

5. A speech coding apparatus as claimed in claim 3, characterized in that a first subset of the reference feature vector signals has a mean, a first subset of the training feature vector signals has a mean, and the nonlinear transformation maps the mean of the first subset of the reference feature vector signals to the mean of the first subset of the training feature vector signals.

6. A speech coding apparatus as claimed in claim 5, characterized in that the first subset of the reference feature vector signals has a variance, the first subset of the training feature vector signals has a variance, and the nonlinear transformation maps the variance of the first subset of the reference feature vector signals to the variance of the first subset of the training feature vector signals.

7. A speech coding apparatus as claimed in claim 5, characterized in that a subgroup of the first subset of the reference feature vector signals has a mean, a subgroup of the first subset of the training feature vector signals has a mean, and the nonlinear transformation maps the mean of the subgroup of the first subset of the reference feature vector signals to the mean of the subgroup of the first subset of the training feature vector signals.

8. A speech coding apparatus as claimed in claim 5, characterized in that the means for storing a plurality of prototype vector signals comprises electronic read/write memory.

9. A speech coding apparatus as claimed in claim 8, characterized in that the measuring means comprises a microphone.

10. A speech coding method comprising:

measuring the value of at least one feature of an utterance during each of a series of successive time intervals to produce a series of feature vector signals representing the feature values;

storing a plurality of prototype vector signals, each prototype vector signal having at least one parameter value, each prototype vector signal having a unique identification value;

comparing the closeness of the feature value of a feature vector signal to the parameter values of the prototype vector signals to obtain prototype match scores for the feature vector signal and each prototype vector signal; and outputting at least the identification value of the prototype vector signal having the best prototype match score as a coded representation signal of the feature vector signal;

characterized in that the method further comprises:

storing a plurality of reference feature vector signals, each reference feature vector signal representing the value of at least one feature of one or more utterances of one or more speakers in a reference set of speakers during each of a plurality of successive time intervals;

storing a plurality of measured training feature vector signals, each measured training feature vector signal representing the value of at least one feature of one or more utterances of a speaker not in the reference set during each of a plurality of successive time intervals;

transforming at least one reference feature vector signal into a synthesized training feature vector signal; and generating the prototype vector signals from both the measured training vector signals and from the synthesized training vector signal.

11. A speech coding method as claimed in claim 10, characterized in that the transforming step applies a nonlinear transformation to the reference feature vector signal to produce the synthesized training feature vector signal.

12. A speech coding method as claimed in claim 11, characterized in that the nonlinear transformation is a piecewise linear transformation.

13. A speech coding method as claimed in claim 12, characterized in that the nonlinear transformation maps the reference feature vector signals to the training feature vector signals.

14. A speech coding method as claimed in claim 12, characterized in that a first subset of the reference feature vector signals has a mean, a first subset of the training feature vector signals has a mean, and the nonlinear transformation maps the mean of the first subset of the reference feature vector signals to the mean of the first subset of the training feature vector signals.

15. A speech coding method as claimed in claim 14, characterized in that the first subset of the reference feature vector signals has a variance, the first subset of the training feature vector signals has a variance, and the nonlinear transformation maps the variance of the first subset of the reference feature vector signals to the variance of the first subset of the training feature vector signals.

16. A speech coding method as claimed in claim 14, characterized in that a subgroup of the first subset of the reference feature vector signals has a mean, a subgroup of the first subset of the training feature vector signals has a mean, and the nonlinear transformation maps the mean of the subgroup of the first subset of the reference feature vector signals to the means of the subgroup of the first subset of the training feature vector signals.

17. A speech recognition apparatus comprising:
means for measuring the value of at least one feature of an utterance during each of a series of successive time intervals to produce a series of feature vector signals representing the feature values;
means for storing a plurality of prototype vector signals, each prototype vector signal having at least one parameter value, each prototype vector signal having a unique identification value;
means for comparing the closeness of the feature value of each feature vector signal to the parameter values of the prototype vector signals to obtain prototype match scores for each feature vector signal and each prototype vector signal;
means for outputting at least the identification values of the prototype vector signals having the best prototype match score for each feature vector signal as a sequence of coded representations of the utterance;
means for generating a match score for each of a plurality of speech units, each match score comprising an estimate of the closeness of a match between a model of the speech unit and the sequence of coded representations of the utterance, each speech unit comprising one or more speech subunits;
means for identifying one or more best candidate speech units having the best match scores; and
means for outputting at least one speech subunit of one or more of the best candidate speech units;
characterized in that the apparatus further comprises:
means for storing a plurality of reference feature vector signals, each reference feature vector signal representing the value of at least one feature of one or more utterances of one or more speakers in a reference set of speakers during each of a plurality of successive time intervals;
means for storing a plurality of measured training feature vector signals, each measured training feature vector signal representing the value of at least one feature of one or more utterances of a speaker not in the reference set during each of a plurality of successive time intervals;
means for transforming at least one reference feature vector signal into a synthesized training feature vector signal; and
means for generating the prototype vector signals from both the measured training vector signals and from the synthesized training vector signal.

18. A speech recognition apparatus as claimed in claim 17, characterized in that the transforming means applies a nonlinear transformation to the reference feature vector signal to produce the synthesized training feature vector signal.

19. A speech recognition apparatus as claimed in claim 18, characterized in that the nonlinear transformation is a piecewise linear transformation.

20. A speech recognition apparatus as claimed in claim 19, characterized in that the nonlinear transformation maps the reference feature vector signals to the training feature vector signals.

21. A speech recognition apparatus as claimed in claim 19, characterized in that a first subset of the reference feature vector signals has a mean, a first subset of the training feature vector signals has a mean, and the nonlinear transformation maps the mean of the first subset of the reference feature vector signals to the mean of the first subset of the training feature vector signals.

22. A speech recognition apparatus as claimed in claim 21, characterized in that the first subset of the reference feature vector signals has a variance, the first subset of the training feature vector signals has a variance, and the nonlinear transformation maps the variance of the first subset of the reference feature vector signals to the variance of the first subset of the training feature vector signals.

23. A speech recognition apparatus as claimed in claim 21, characterized in that a subgroup of the first subset of the reference feature vector signals has a mean, a subgroup of the first subset of the training feature vector signals has a mean, and the nonlinear transformation maps the mean of the subgroup of the first subset of the reference feature vector signals to the mean of the subgroup of the first subset of the training feature vector signals.

24. A speech recognition apparatus as claimed in claim 21, characterized in that the means for storing a plurality of prototype vector signals comprises electronic read/write memory.

25. A speech recognition apparatus as claimed in claim 24, characterized in that the measuring means comprises a microphone.

26. A speech recognition apparatus as claimed in claim 25, characterized in that the speech subunit output means comprises a video display.

27. A speech recognition apparatus as claimed in claim 26, characterized in that the video display comprises a cathode ray tube.

28. A speech recognition apparatus as claimed in claim 26, characterized in that the video display comprises a liquid crystal display.

29. A speech recognition apparatus as claimed in claim 26, characterized in that the video display comprises a printer.

30. A speech recognition apparatus as claimed in claim 25, characterized in that the speech subunit output means comprises an audio generator.

31. A speech recognition apparatus as claimed in claim 30, characterized in that the audio generator comprises a loudspeaker.

32. A speech recognition apparatus as claimed in claim 30, characterized in that the audio generator comprises a headphone.

33. A speech recognition method comprising:
measuring the value of at least one feature of an utterance during each of a series of successive time intervals to produce a series of feature vector signals representing the feature values;

storing a plurality of prototype vector signals, each prototype vector signal having at least one parameter value, each prototype vector signal having a unique identification value;

comparing the closeness of the feature value of each feature vector signal to the parameter values of the prototype vector signals to obtain prototype match scores for each feature vector signal and each prototype vector signal;

outputting at least the identification values of the prototype vector signals having the best prototype match score for each feature vector signal as a sequence of coded representations of the utterance;

generating a match score for each of a plurality of speech units, each match score comprising an estimate of the closeness of a match between a model of the speech unit and the sequence of coded representations of the utterance, each speech unit comprising one or more speech subunits;

identifying one or more best candidate speech units having the best match scores; and outputting at least one speech subunit of one or more of the best candidate speech units;

characterized in that the method further comprises:

storing a plurality of reference feature vector signals, each reference feature vector signal representing the value of at least one feature of one or more utterances of one or more speakers in a reference set of speakers during each of a plurality of successive time intervals;

storing a plurality of measured training feature vector signals, each measured training feature vector signal representing the value of at least one feature of one or more utterances of a speaker not in the reference set during each of a plurality of successive time intervals;

transforming at least one reference feature vector signal into a synthesized training feature vector signal; and generating the prototype vector signals from both the measured training vector signals and from the synthesized training vector signal.

34. A speech recognition method as claimed in claim 33, characterized in that the step of transforming applies a nonlinear transformation to the reference feature vector signal to produce the synthesized training feature vector signal.

35. A speech recognition method as claimed in claim 34, characterized in that the nonlinear transformation is a piecewise linear transformation.

36. A speech recognition method as claimed in claim 35, characterized in that the nonlinear transformation maps the reference feature vector signals to the training feature vector signals.

37. A speech recognition method as claimed in claim 35, characterized in that a first subset of the reference feature vector signals has a mean, a first subset of the training feature vector signals has a mean, and the nonlinear transformation maps the mean of the first subset of the reference feature vector signals to the mean of the first subset of the training feature vector signals.

38. A speech recognition method as claimed in claim 37, characterized in that the first subset of the reference feature vector signals has a variance, the first subset of the training feature vector signals has a variance, and the nonlinear transformation maps the variance of the first subset of the reference feature vector signals to the variance of the first subset of the training feature vector signals.

39. A speech recognition method as claimed in claim 37, characterized in that a subgroup of the first subset of the reference feature vector signals has a mean, a subgroup of the first subset of the training feature vector signals has a mean, and the nonlinear transformation maps the mean of the subgroup of the first subset of the reference feature vector signals to the mean of the subgroup of the first subset of the training feature vector signals.

* * * * *